Figure 4:
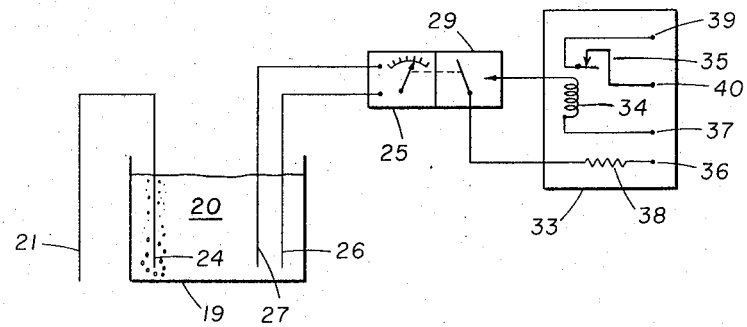

Jan. 24, 1967   J. C. FAILS   3,300,324
HYDROGEN SULFIDE DETECTION METHOD AND CONTROL SYSTEM
Filed May 20, 1963   2 Sheets-Sheet 1
FIG. 3
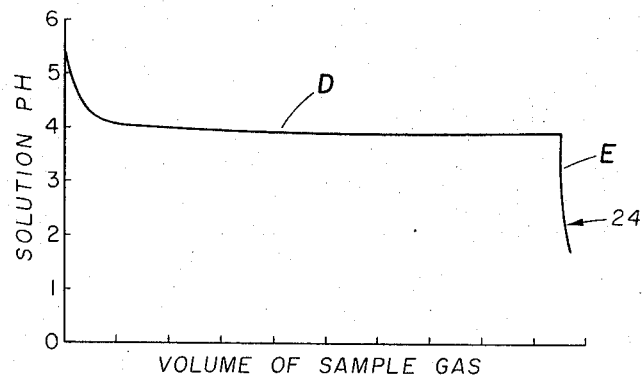
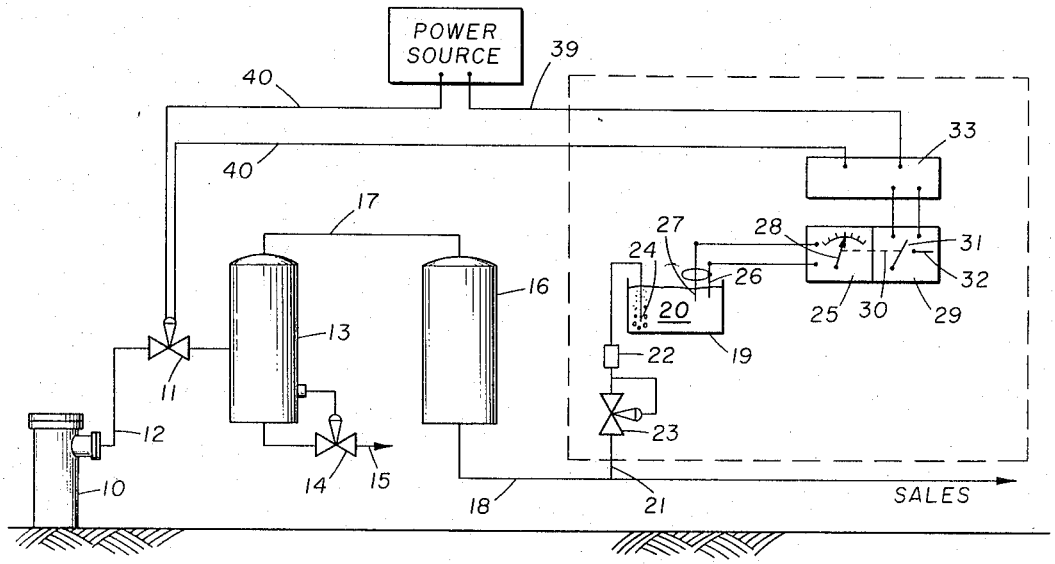
FIG. 1
JAMES C. FAILS
INVENTOR.
BY *Emil J. Bednar*
ATTORNEY

JAMES C. FAILS
INVENTOR.

BY Emil J. Bednar

ATTORNEY

United States Patent Office 3,300,324
Patented Jan. 24, 1967

3,300,324
HYDROGEN SULFIDE DETECTION METHOD AND CONTROL SYSTEM
James C. Fails, Dallas, Tex., assignor to Mobil Oil Corporation, a corporation of New York
Filed May 20, 1963, Ser. No. 281,738
8 Claims. (Cl. 48—196)

This invention relates to the detection and control of gases containing hydrogen sulfide. More particularly, it relates to a method and a system for controlling the flow of natural gas streams contaminated with hydrogen sulfide.

Natural gas is available from many sour-gas wells each having only a limited production of hydrocarbons. The natural gas usually contains a large amount of hydrogen sulfide. It may also contain carbon dioxide. The natural gas from such wells must be processed to a sweetened natural gas before it can be utilized. By sweetened natural gas it is meant a natural gas containing not more than the maximum permissible hydrogen sulfide as set by a regulatory body. For example, the permissible maximum is one-quarter grain of hydrogen sulfide per hundred cubic feet of natural gas in the State of Texas. It is uneconomical to process small quantities of a natural gas having a large hydrogen sulfide and carbon dioxide content by presently used commercial sweetening processes at the wellhead. For example, the sweetening of natural gas from sour-gas wells by conventional procedures, such as the ethanolamine absorption process, is uneconomical where large amounts of carbon dioxide must also be removed with the hydrogen sulfide. However, a selective adsorption process has been developed for economically sweetening such natural gas in small quantities at the sour-gas well.

The selective adsorption process uses one of several molecular sieves for selectively adsorbing only the hydrogen sulfide from the carbon dioxide rich natural gas from the sour-gas wells. After the molecular sieves reach a state of equilibrium in their adsorption of hydrogen sulfide they may be reactivated. Thus, the molecular sieves are easily adapted to a cyclic adsorption procedure including a first period for removing hydrogen sulfide from the natural gas from sour-gas wells and a second period for regeneration. The sweetened natural gas contains substantially the original amount of carbon dioxide, but with the hydrogen sulfide content reduced to between 0.04 and 0.07 grain per 100 cubic feet during the first period of the molecular-sieve adsorption process. The change between the sweetened natual gas having this range of hydrogen sulfide at the end of the first period to the unsweetened natural gas when the molecular sieve is saturated is very sudden. Thus, within a small volume of processed natural gas, the hydrogen sulfide will very quickly change from less than one-tenth grain per 100 cubic feet of natural gas to substantially the hydrogen sulfide content of the natural gas from the sour-gas wells. Reference may be had to the article entitled, "Practical Way To Sweeten Natural Gas," published in the oil and gas journal of July 11, 1960, volume 58, No. 28 for further description of this process.

The molecular-sieve adsorption process can be easily made to operate on an automatic cyclic basis. Thus, it can be used in the field at the sour-gas wells without human supervision. However, some reliable means for detecting and controlling the natural gas stream from the molecular-sieve adsorption process by the amount of hydrogen sulfide present in the processed natural gas must be utilized. Further, the control means must not be activated by the small amounts of hydrogen sulfide present in the sweetened gas. On the other hand, the control means must be very quickly activated by any increase above the permissible amounts of hydrogen sulfide in the sweetened natural gas. There are known control means for detecting and controlling a natural gas stream by the amount of contaminating hydrogen sulfide. However, I have found these control means to be unsatisfactory for use in remote and isolated locations where the sour-gas wells are usually found.

It is therefore an object of the present invention to provide for the detection and control of gases containing hydrogen sulfide.

Anoher object is to provide a method and a system for controlling the flow of natural gas streams contaminated with hydrogen sulfide.

Another object is to provide a method and a system for controlling the operation of the recently developed molecular-sieve adsorption processes for sweetening natural gas.

Another object is to provide for controlling the flow of hydrogen sulfide contaminated natural gas streams which may initially contain a small amount of hydrogen sulfide for large volumes of natural gas and then contain a large amount of hydrogen sulfide for each additional volume of natural gas.

Another object of the present invention is to provide a method and a system for controlling the flow of natural gas streams contaminated with hydrogen sulfide which can be used in remote locations without frequent human supervision.

Another object is to provide a method and a system in accordance with the preceding objects which require no complicated elements or exactingly prepared solutions or reagents, and which are operable from conventional power sources.

Another object is to provide a method and a system in accordance with the preceding objects for controlling the operation of any process for removing hydrogen sulfide from the natural gas from sour-gas wells.

Figure 5:
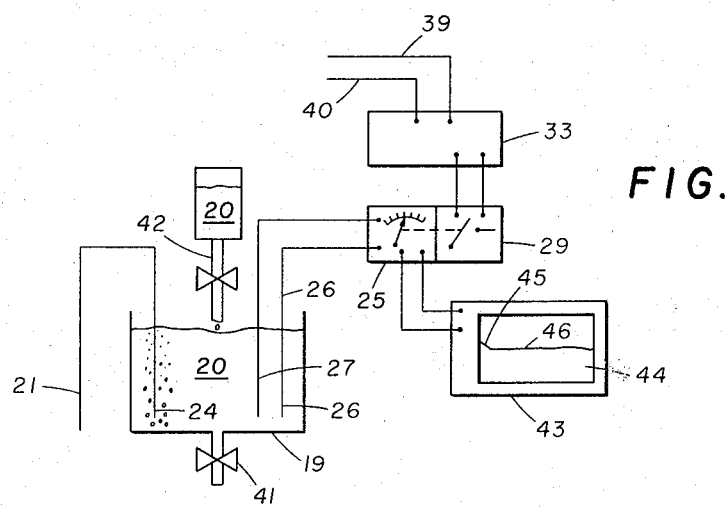
Figure 2:
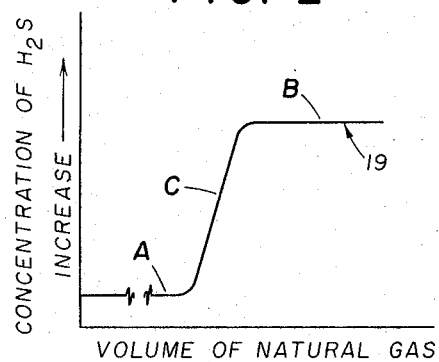

These and other objects will become more apparent when read in conjunction with the following detailed description of an illustrative and preferred embodiment of the present invention, the appended claims, and the attached drawings wherein:

FIGURE 1 is a diagrammatic illustration of a system of this invention,

FIGURE 2 is a curve illustrating the sudden change of the concentration of hydrogen sulfide in the processed natural gas stream by the mentioned adsorption process upon saturation of the molecular sieve with hydrogen sulfide, FIGURE 3 is an equilibrium curve in which the pH of a solution employed in this invention is plotted against the volume of a sample of the natural gas stream contaminated by hydrogen sulfide passed into such solution, FIGURE 4 illustrates a portion of the system of FIGURE 1 in greater detail, and FIGURE 5 is a diagrammatic illustration of a modification of the system shown in FIGURE 1 for monitoring continuous flowing natural gas streams.

The objects of the present invention are obtained by a method and a system of the type described in which is used a water solution of a metal ion reacting with hydrogen sulfide to produce an insoluble precipitate and a proportionate amount of excess hydrogen ions. A portion of the natural gas stream, suspected of being contaminated with hydrogen sulfide, is passed through the solution. An amount of excess hydrogen ions proportionate to the amount of hydrogen sulfide in the natural gas stream is produced in the water solution. The solution may be adjusted by volume, or dilution with more solution, to prevent accumulation of a certain amount of excess hydrogen ions in a given length of time where the natural gas may acceptably contain less than the maximum permissible concentration of hydrogen sulfide. Thus, concentrations of hydrogen sulfide above the acceptable limit in natural gas will produce more than the certain amount of excess hydrogen ions in the solution. The amount of excess hydrogen ions in the solution is monitored. When the hydrogen ions increase above the certain amount, a control function is provided. The control function is adapted to control the flow of the natural gas stream.

The present invention will be described in operable association with a molecular-sieve, selective adsorption, process for sweetening natural gas and its utility in controlling the flow of the sweetened natural gas. The process, for purposes of illustration, will be used to sweeten a sour natural gas containing 189 grains of hydrogen sulfide per 100 cubic feet of gas and about 5 percent by volume of carbon dioxide. However, the present invention is of utility in controlling the flow of sweetened natural gas from other natural gas sweetening procedures.

Proceeding to the drawings, in FIGURE 1 there is shown a sour-gas well 10 as a source of the natural gas contaminated with hydrogen sulfide and carbon dioxide in the ranges priorly described. The sour natural gas is passed through a motor valve 11, which will be more fully described hereafter, via conduit 12 to a gas-liquid separator 13. The separator 13 is usually necessary since a reduction in pressure from the well pressure of the sour natural gas occuring prior to the sweetening operation will result in some condensate forming. The separator 13 may be provided with a liquid level control valve 14 for controlling the removal of condensate from the bottom of the separator 13 via a condensate line 15. The condensate-free sour natural gas from the separator 13 is sent to an adsorber 16 by means of a conduit 17. The adsorber 16 is provided with a suitable molecular-sieve material such as described in the priorly identified publication.

In a specific example, a hundred pounds of the molecular-sieve material may be used to sweeten about 1.5 million cubic feet of the sour natural gas in a three-hour period prior to saturating of the molecular-sieve material with hydrogen sulfide. Thus, the adsorber 16 may be operated for approximately 3 hours before it requires regeneration.

The various means for regenerating the molecular-sieve material in the adsorber 16 are well known, and for this reason are not shown in the drawings nor described to avoid lengthening the description of this invention. The sweetened natural gas passes from the adsorber 16 into a conduit 18 for disposal by sales or otherwise. As previously described, the molecular-sieve process can produce approximately 1.5 million cubic feet of natural gas having between 0.04 to 0.07 grain per hundred cubic feet of hydrogen sulfide contaminant into conduit 18. The concentration of carbon dioxide will be substantially unchanged. As the molecular-sieve material becomes saturated with hydrogen sulfide, the concentration of hydrogen sulfide in the natural gas in the conduit 18 will suddenly rise to about 189 grains per 100 cubic feet of gas.

Reference may be made to FIGURE 2 wherein the sudden change in the concentration of hydrogen sulfide in the effluent from the adsorber 16 in conduit 18 is graphically illustrated. The concentration of hydrogen sulfide is plotted along the ordinate. The volume of effluent natural gas from the adsorber 16 is plotted along the abscissa. These coordinate plottings produce the curve 19. Portion A of curve 19 represents the 15 million cubic feet of natural gas having about 0.04 to 0.07 grain of hydrogen sulfide per 100 cubic feet of gas. Portion B of the curve 19 represents the effluent natural gas after the molecular-sieve material in adsorber 16 is saturated with hydrogen sulfide. Portion C of the curve 19 illustrates the vast change in the hydrogen sulfide concentration in the effluent natural gas for a small volume of gas from adsorber 16 upon the molecular-sieve material being saturated with hydrogen sulfide.

Thus, a method and a system to control the effluent natural gas in conduit 18 must not be falsely activated by small concentrations of hydrogen sulfide in large volumes of natural gas. Additionally, the control function must take place immediately upon an increase above a permissible maximum concentration of hydrogen sulfide in the effluent natural gas in the conduit 18. The method and system of this invention now to be described accomplishes both these results.

Returning to FIGURE 1, there is shown a reservoir 19 adapted to contain a liquid. Means may be provided for the reservoir 19 for periodically replacing the liquid. Such means are well known to those skilled in the art and thus will not be described. Residing in the reservoir 19 is a water solution 20 of a metal ion as previously described. For example, the water solution 20 may be an aqueous solution of cadmium sulfate. Inlet means are provided for passing a sample of the effluent natural gas from the conduit 18 into the water solution 20. The inlet means may be comprised of a sample line 21 connected between the effluent natural gas conduit 18 and the solution 20. A calibrated orifice 22 may be connected in the sample line 21 to provide a metered flow of the effluent natural gas sample. A pressure regulating valve 23 may also be placed in the sample line 21 upstream of the orifice 22 to regulate the pressure of the gas to insure a uniform flow of gas through the orifice 22 which flow is representative of the flow of the effluent natural gas in conduit 18. Contacting means are provided on the sample line 21 to produce intimate contact between the sample gas and the water solution in the reservoir. For example, a fritted gas bubbler 24 may be used as the contacting means. By adjusting the pressure in the sample line 21 at the calibrated orifice 22 about 10 cubic feet per hour of effluent natural gas can be passed through the fritted gas bubbler 24 into intimate contact with the water solution 20. The inlet means may be comprised of other elements to provide a constant flow of the effluent natural gas to be passed into the water solution 20, if desired. Thus, there will be produced in the water solution 20 an amount of excess hydrogen ions proportional to the amount of hydrogen sulfide contained in the sample of effluent natural gas, and obviously in the effluent natural gas in the conduit 18.

Using a water solution of a metal ion, such as cadmium, which reacts with hydrogen sulfide to provide an insoluble precipitate and a proportionate amount of excess hydrogen ions provides a sensitive and reliable means to detect and measure the amount of hydrogen sulfide in the effluent natural gas in conduit 18. For example, using 100 cubic centimeters of 0.1 normal cadmium sulfate as the water solution 20 in the reservoir 19, a sensitive and reliable means to detect the presence of hydrogen sulfide is provided. This water solution of cadmium will not produce excess hydrogen ions when the effluent natural gas in conduit 18 has less than about 0.1 grain of hydrogen sulfide per 100 cubic feet of gas. This is the case during operation of the adsorber 16 represented by the portion A of curve 19 in FIGURE 2 where the concentration of hydrogen sulfide is between 0.04 to 0.07 grain per 100 cubic feet. Reference to FIGURE 3 will graphically illustrate this operation. The excess hydrogen ion concentration in the solution 20 is plotted as pH on the ordinate. By pH it is meant the negative logarithm to the base 10 of the hydrogen ion concentration. The volume of the effluent natural gas sample is plotted along the abscissa. The result of a typical operation produces curve 24. Portion D of the curve 24 illustrates the effect of the carbon dioxide in producing excess hydrogen ions until a pH value of about 3.8 is obtained. This is the equilibrium result produced in a solution containing carbonic acid. No excess hydrogen ions are produced from hydrogen sulfide. When the concentration of hydrogen sulfide in the effluent natural gas suddenly rises to 189 grains per 100 cubic feet of gas, a large increase in the excess hydrogen ions present in the water solution 20 occurs. This increase, as a large reduction in pH below a value of 3.8, is represented by a portion E of curve 24. Thus, if the amount of excess hydrogen ions, or pH, is monitored, a large decrease in pH occurs when the effluent natural gas is no longer sweetened in the adsorber 16.

Although the water solution 20 has been described as 0.1 normal cadmium sulfate, it is obvious that other water-soluble salts of cadmium may also be used; for example, cadmium compounds having anions of nitrate, chlorate, nitrite, thiosulphate, acetate, chloride, bromide, iodide; and sulfate. Other substance may be present in the water solution 20 besides the desired metal ion. However, these substances should not provide an interfering function with the reaction of hydrogen sulfide and the metal ion to produce a precipitate and excess hydrogen ions.

Means are provided for monitoring the amount of excess hydrogen ions in the water solution. Most conveniently, the monitoring means may be provided by a pH meter. By "pH meter," as the term is used herein, is meant a device for determining the concentration of the excess hydrogen ions present in an aqueous solution. Any type of pH meter is suitable. However, it is preferred to use a self-contained, line-operated, direct-indicating pH meter. One pH meter that can be used is commercially available under the trade name "Beckman Zeromatic." This pH meter is provided with a glass electrode and a calomel electrode for contacting the solution to be examined. This unit is self-contained, requiring only conventional source of power for its operation. The pH meter has output terminals to which may be connected a recorder. The recorder may be either a potentiometric or a current measuring recorder. In the former case, a resistor is required for which terminals are provided on the inside of the terminal board of the pH meter. Assuming this particular device to be representative of the monitoring means used in the present invention, the description of the present invention will continue with especial reference to FIGURE 1.

In FIGURE 1 is shown a pH meter 25 having a glass electrode 26 and a calomel electrode 27 in contact with the water solution 20. By this means, the pH meter 25 will produce a potential as an electrometric function which varies proportionally with the amount of excess hydrogen ions in the water solution 20. The potential is visually reflected as values of pH or millivolts from a meter means 28 on the pH meter 25. Thus, the amount of excess hydrogen ions in the water solution 20 is continuously monitored.

Signal means 29 are operably connected to the pH meter 25 for producing a signal function upon a certain amount of excess hydrogen ions being produced in the water solution 20 as occurs upon saturation of the molecular sieve in the adsorber 16 with hydrogen sulfide. The signal means 29 may be any device capable of producing a control function responsive to a certain potential reflected as a pH value or millivolts on the meter means 28. For example, the signal means 29 may be provided by a Mercoid switch adapted to be actuated when the meter means 28 reaches a selected pH value, for example, a pH of about 3.0. This arrangement is shown in the United States Patent 2,772,779. However, it is preferred to use one of the conventional meter relays adapted to be operably joined with meter means 28 of the pH meter 25 as illustrated by chain-line 30 to actuate switch elements 31 and 32 at a selected pH value. By this means, a circuit external of the pH meter 25 is controlled responsively to a certain potential being present which, of course, reflects the amount of excess hydrogen ions. Examples of suitable meter relays are the model 2545 electronic control meter available from International Instruments, and the model 661–C meter relay available from Assembly Products, Inc.

Thus, a signal function is produced upon the water solution 20 containing a certain amount of excess hydrogen ions. In the present description the signal function is the control of an external electric circuit. This signal function may be used to control the flow of effluent natural gas in conduit 18 by means of the motor valve 11 in conduit 12 from the sour-gas well 10. The motor valve 11 may be provided with an electrically controlled actuator. Preferably, the motor valve 11 is adapted to be closed upon de-energization so that it provides a failsafe operation in the event of power failure.

The usual meter relay or signal means 29 may not carry sufficient currents to operate directly the motor valve 11 with safety. For this reason, it is desirable to use a utilization device 33 for providing the controlled current to operate the motor valve 11 responsive to the signal function of the signal means 29. Referring to FIGURE 4, the utilization device 33 is shown in an illustrative schematic. The utilization device 33 contains a relay 34 adapted to open switch means 35 upon completion of a power transmitting circuit from a power source connected to conductors 36 and 37 via closing of the switch elements 31 and 32. A current limiting resistance 38 may be connected in series with conductors 36 and 37 to protect the switch elements 31 and 32. Energizing the relay 34 opens the circuit between the motor valve 11 and a source of power connected to conductors 39 and 40, as is seen in FIGURE 1. This closes the motor valve 11 terminating the sour-gas flow from the well 10 to the separator 13 and also through the conduit 18. The present description has been limited to controlling electromagnetically actuated fluid transfer members associated with the sour-gas conduit 12 in response to an electrical signal function provided by the signal means. However, it will be obvious that other types of signal functions for controlling fluid transfer members for the natural gas, and their associated controls, may be used.

Obviously, the signal function may also be used to control the regeneration of the molecular-sieve material in the adsorber 16, to place a fresh batch of the water solution 20 into the reservoir 19, and after regeneration, to begin a new cycle of sweetening the natural gas from sour-gas well 10.

From the foregoing, it will be apparent that the following steps have been practiced. The effluent natural gas in conduit 18 is sampled, and the sample is passed into the water solution 20. The amount of excess hydrogen ions in the water solution 20 is continuously monitored. The flow of the natural gas in the conduit 18 is terminated upon a certain amount of excess hydrogen ions being introduced into the water solution 20 by the effluent natural gas containing an amount of hydrogen sulfide greater than is desired to be transported in the conduit 18.

Referring now to FIGURE 5, there is shown a modification of the embodiment previously described for use in detecting and controlling the flow of natural gas streams having an acceptable concentration of hydrogen sulfide above the reactive limit in the water solution 20 in the sweetened effluent natural gas.

Thus, it will be obvious that within a given period of time a considerable accumulation of excess hydrogen ions in the water solution can take place. The accumulation may be so great as to provide a false indication of a failure of the sweetening process to maintain the hydrogen sulfide concentration below the required one-fourth grain per 100 cubic feet statutory limit. This is especially true where the sweetening process operates continuously rather than on a cyclic basis of treating and regenerating as does the molecular-sieve process.

For example, in the ethanolamine absorption process the concentration of hydrogen sulfide in the effluent natural gas in conduit 18 during normal continuous operations is above 0.1 but below one-fourth grain per 100 cubic feet for extended periods of time. The modified embodiment shown in FIGURE 5 is adapted to operate satisfactorily under these conditions. The embodiment is substantially the same as shown in the chain-like enclosure of FIGURE 1. The same constituents in both views bear like numeral designations and will not be again described to avoid repetition.

The reservoir 19 is provided with draining means 41 and filling means 42 in fluid connection with the water solution 20. By the draining means 41 and the filling means 42, the water solution 20 may be removed at a given rate and an equivalent portion of fresh solution of cadmium ion or other desired metal ion added to the water solution 20 residing in the reservoir 19. The drainage means 41 may be provided by a calibrated flow line adapted to remove the water solution 20 at a given rate. The filling means 42 may include a source of the water solution 20 which may be introduced into the reservoir 19 by a calibrated flow line at the same rate as the water solution 20 is removed from the reservoir 19. The means for regulating the flow rate in both flow lines may be adjustable metering valves, fixed orifices, or the like. The rate is selected to be sufficient to prevent the accumulation of a given amount of excess hydrogen ions from an effluent natural gas stream in conduit 18 when contaminated with above 0.1 grain per 100 cubic feet of hydrogen sulfide but with less than the maximum allowable concentration of hydrogen sulfide. For example, using a hundred milliliters of 0.1 normal cadmium sulfate solution and with a sample natural gas flow as previously described, a sweetened effluent natural gas containing one-eighth grain of hydrogen sulfide per 100 cubic feet of gas would produce a pH value of about 3.0 in about two hours to activate falsely the system. To avoid this undesired result, the water solution 20 is continuously replaced with an equivalent amount of fresh water solution 20 at a rate of 1 milliliter in each 50 minutes. This will prevent an excessive amount of hydrogen ions to be produced by the acceptable but reactable amounts of hydrogen sulfide present in effluent natural gas. However, when the hydrogen sulfide concentration in the effluent natural gas goes above the desired amount, for example, one-fourth grain per 100 cubic feet, the water solution 20 will accomulate excess hydrogen ions at a rapid rate to quickly produce a pH value of about 3.0. This results in the desired control function by actuating the system.

It will be apparent that the additional following steps may be practiced to prevent false activation of the system by reactable but acceptable amounts of hydrogen sulfide in the effluent natural gas. The water solution 20 is removed from the reservoir 19 at a given rate, and an equivalent portion of fresh water solution 20 is added to the reservoir 19. The given rate is selected to be sufficient to prevent the accumulation of a given amount of excess hydrogen ions from the effluent natural gas stream. The amount of excess hydrogen ions in the water solution 20 in the reservoir 19 is continuously monitored until the production of a certain amount of excess hydrogen ions resulting by the effluent natual gas having a concentation of hydogen sulfide above the pemissible maximum concentration.

It may also be desirable in some instances of continuous sweetening operations, or otherwise, to provide a record of the concentration of hydrogen sulfide in the gas. This can be done most conveniently by the use of a recorder 43 connected to the pH meter 25. As can be seen in FIGURE 5, the recorder 43, for example, a potentiometric recorder, provides a visual record by means of a moving chart 44 cooperating with a means 45, such as an inking pen, for producing a continuous line 46 recording the amount of excess hydrogen ions in the water solution 20. Obviously, the continuous line 46 is a record of the concentration of hydrogen sulfide in the effluent natural gas versus time. Further, as the amount of hydrogen ions increases in the water solution 20 proportionally to the concentration of hydrogen sulfide in the effluent natural gas in conduit 18, the line 46 will deviate proportionally from its previous slope. By calibration of the slope of the line 46 versus the proportionate amount of excess hydrogen ion in the water solution 20, the method and system of the present invention may be also used to provide a quantitative record of the hydrogen sulfide concentration in the effluent natural gas.

Although the water solution 20 has been particularly described as the solution of cadmium sulfate or other of its water-soluble salts, other metal ions providing equivalent results may be used. The water-soluble salts of mercury, including mercuric chloride, bromide, cyanide, chlorate, and acetate may be used. Also, the water-soluble salts of lead may be used, including plumbic nitrate, nitrite, chlorate, and acetate. Other metal ions that are of utility will be apparent to those skilled in the art.

From the foregoing, it will be apparent that there has been disclosed a method and a system satisfying the stated objects of this invention. Further, various changes and modifications of the present disclosure will become apparent to persons skilled in the related art without departing from the intent of this invention. It is intended that this description be taken as illustrative of my invention and that the only limitations are those set forth in the following claims.

What is claimed is:

1. A method for detecting and controlling a gas stream in a conduit at a maximum hydrogen sulfide content comprising the steps of:
   (a) sampling the gas stream,
   (b) passing the gas stream sample into a water solution of a metal ion which by reaction with hydrogen sulfide produces an insoluble precipitate and excess hydrogen ions, correlating the flow of the sample and the metal ion concentration so that acceptable small amounts of hydrogen sulfide in several volumes of said sample are nonreactive to produce a certain amount of excess hydrogen ions in the water solution and a sudden increase to unacceptable larger amounts of hydrogen sulfide in a following volume of said fluid produces a certain amount of excess hydrogen ions in said water solution,
   (c) continuously monitoring the amount of excess hydrogen ions in the water solution, and
   (d) terminating the flow of the gas stream in the conduit upon the certain amount of excess hydrogen ions being introduced into the water solution by the gas stream sample containing more than the greatest amount of hydrogen sulfide desired to be transported in the gas stream.

2. The method of claim 1 wherein the water solution of a metal ion is comprised of water and a water-soluble compound of cadmium.

3. The method of claim 1 wherein the water solution of a metal ion is comprised of water and a substance selected from the group consisting of cadmium compounds having anions of nitrate, chlorate, nitrite, thiosulfate, acetate, chloride, bromide, iodide, and sulfate.

4. The method of claim 3 wherein the water solution of a metal ion is comprised of water and cadmium sulfate.

5. A method for detecting and controlling a gas stream in a conduit at a maximum hydrogen sulfide content comprising the steps of:
   (a) sampling the gas stream,
   (b) passing the gas stream sample into a water solution of a metal ion which by reaction with hydrogen sulfide produces an insoluble precipitate and excess hydrogen ions, correlating the flow of the sample and the metal ion concentration so that acceptable small amounts of hydrogen sulfide in several volumes of said sample are nonreactive to produce a certain amount of excess hydrogen ions in the water solution and a sudden increase to unacceptable larger amounts of hydrogen sulfide in a following volume of said fluid produces a certain amount of excess hydrogen ions in said water solution, (c) continuously measuring the pH of the water solution, and (d) terminating the flow of the gas stream in the conduit upon the certain pH resulting in the water solution produced by the greatest amount of hydrogen sulfide desired to be transported in the gas stream.

6. A method for detecting and controlling a gas stream in a conduit at a maximum hydrogen sulfide content comprising the steps of:

(a) passing a portion of the suspected hydrogen sulfide contaminated gas stream into a constant volume of a water solution of a metal ion which by reaction with hydrogen sulfide produces an insoluble precipitate and excess hydrogen ions, the water solution containing sufficient metal ions to provide a given excess of hydrogen ions upon reacting with a quantity of gas having a certain hydrogen sulfide concentration, (b) monitoring the amount of excess hydrogen ions in the water solution, and (c) terminating the flow of the gas stream in the conduit upon the water solution containing the given amount of excess hydrogen ions.

7. The method of claim 6 wherein a portion of the water solution is removed at a given rate, and an equivalent portion of water solution is added to the water solution, said given rate being sufficient to prevent the production of the given amount of excess hydrogen ions by accumulation from a gas stream contaminated with less than the certain hydrogen sulfide concentration, and continuing to monitor the amount of excess hydrogen ions in the water solution until the gas stream contains the certain hydrogen sulfide concentration.

8. A hydrogen sulfide control system comprising:

(a) a natural gas stream from a source of sour gas carrying unacceptable amounts of hydrogen sulfide, (b) sweetening means for removing hydrogen sulfide from said natural gas stream and providing into a gas conduit a treated natural gas stream with a reduced hydrogen sulfide content for a first period of time, and thereafter for a second period of time, a treated natural gas stream with an unacceptable larger amount of hydrogen sulfide, (c) a fluid transfer member to control the flow through said gas conduit of the treated natural gas, and (d) a detector comprising (1) a reservoir adapted to contain liquids, (2) a water solution of a metal ion producing by reaction with hydrogen sulfide an insoluble precipitate and excess hydrogen ions, said water solution residing in the reservoir, (3) inlet means connected to the gas conduit for passing a portion of the treated natural gas from the gas conduit into said water solution, (4) the metal ion being adjusted at a concentration in said solution that acceptable amounts of hydrogen sulfide in the portion of said treated natural gas passed into the solution in said first period of time are nonreactive to produce a certain amount of excess hydrogen ions in the water solution and that an increase to unacceptable amounts of hydrogen sulfide in a following portion of said treated natural gas passed into the solution in said second period of time are reactive to produce the certain amount of excess hydrogen ions in said water solution, (5) monitoring means in contact with said water solution for producing an electrometric function which function varies with the amount of excess hydrogen ions in said water solution, (6) signal means connected to the monitoring means for producing a signal function upon the electrometric function reflecting the certain amount of excess hydrogen ions in said water solution, and (7) a utilization device operably connected to said signal means, said device controlling the functioning of the fluid transfer members to regulate the flow of treated natural gas through the gas conduit in response to the signal function.

References Cited by the Examiner

UNITED STATES PATENTS 1,475,000  11/1923  Cooper et al. _____ 23—255

OTHER REFERENCES

Hogness & Johnson, Qualitative Analysis and Chemical Equilibrium, Henry Holt and Co., New York, N.Y. (fourth edition, 1954), pp. 346, 348, 402–404.

Mattock & Taylor, pH Measurement and Titration, Heywood & Co., Ltd., London (1961), pp. 298 and 299.

MORRIS O. WOLK, *Primary Examiner.*

JOSEPH SCOVRONEK, H. A. BIRENBAUM,
*Assistant Examiners.*